United States Patent [19]

Wahle

[11] E Patent Number: Re. 32,001

[45] Reissued Date of Patent: Oct. 8, 1985

[54] METHOD AND APPARATUS FOR FEEDING CIGARETTES OR ANALOGOUS ARTICLES TO PACKING MACHINES OR THE LIKE

[75] Inventor: Günter Wahle, Reinbek, Fed. Rep. of Germany

[73] Assignee: Hauni-Werke Körber & Co. KG., Hamburg, Fed. Rep. of Germany

[21] Appl. No.: 926,040

[22] Filed: Jul. 19, 1978

Related U.S. Patent Documents

Reissue of:

[64] Patent No.: 3,854,611
Issued: Dec. 17, 1974
Appl. No.: 245,409
Filed: Apr. 19, 1972

U.S. Applications:

[63] Continuation of Ser. No. 748,927, Dec. 9, 1976.

[30] Foreign Application Priority Data

Apr. 21, 1971 [DE] Fed. Rep. of Germany ..... 2119311

[51] Int. Cl.[4] ..... B65G 65/04; B65B 69/00

[52] U.S. Cl. ..... 414/416; 198/425; 198/347; 414/786

[58] Field of Search ..... 214/301, 152, 302, 307, 214/17 CA; 198/425, 437, 626, 560, 523, 422, 347; 414/416, 786

[56] References Cited

U.S. PATENT DOCUMENTS

| | | | |
|---|---|---|---|
| 2,347,391 | 4/1944 | Benning | 198/164 |
| 3,404,963 | 10/1968 | Fritsche et al. | 214/17 CA |
| 3,460,687 | 8/1969 | Bardenhagen | 214/17 CA |
| 3,520,394 | 7/1970 | Seragnoli | 198/53 |
| 3,532,230 | 10/1970 | Gutberlet et al. | 214/6 H |
| 3,591,018 | 7/1971 | Nalbach | 214/6 DK |
| 3,703,971 | 11/1972 | Rowlands | 214/302 |

*Primary Examiner*—Lawrence J. Oresky
*Attorney, Agent, or Firm*—Peter K. Kontler

[57] ABSTRACT

Trays containing stacks of cigarettes are moved to an evacuating station above a vertically movable platform which descends as soon as the movable bottom of a filled tray is moved to its open position. The platform then lowers a stack of cigarettes from the interior of a filled tray onto the upper stretches of two intermittently driven endless belts in a magazine. The latter serves for temporary storage of such stacks prior to transport of cigarettes into a reservoir which feeds cigarettes into the hopper of a packing machine. The supply of cigarettes in the reservoir is monitored [,] and, when the supply is depleted to a certain minimum permissible value, a switch produces a signal which starts a motor for the belts so as to transfer a stack from the magazine into the reservoir. The stacks are confined during movement into and from the magazine so that the mutual positions of cigarettes in such stacks remain at least substantially unchanged during transport from a filled tray at the evacuating station and all the way into the reservoir.

27 Claims, 4 Drawing Figures

METHOD AND APPARATUS FOR FEEDING CIGARETTES OR ANALOGOUS ARTICLES TO PACKING MACHINES OR THE LIKE

Matter enclosed in heavy brackets [ ] appears in the original patent but forms no part of this reissue specification; matter printed in italics indicates the additions made by reissue.

*Reference to Related Applications*

*This is a continuation of Ser. No. 748,927 filed Dec. 9, 1976, which is reissue of U.S. Pat. No. 3,854,611.*

BACKGROUND OF THE INVENTION

The present invention relates to a method and apparatus for manipulating rod-shaped smokers' products including plain or filter-tipped cigars, cigarillos or cigarettes as well as sections of simple or composite filter rods. More particularly, the invention relates to a method and apparatus for manipulating rod-shaped articles which are temporarily stacked and confined in polygonal receptacles of the type known as chargers or trays and must be fed to a consuming station, for example, to a station accommodating one or more packing machines, one or more machines for pneumatically transporting cigarettes, filter stubs or the like to one or more filter tipping or packing machines and/or other types of consuming machines.

It is well known to introduce the output of one or more producing machines, such as machines for the making of plain or filter cigarettes or machines for the making of simple or multiplex filter rod sections, into receptacles known as trays or chargers and to transport the receptacles to one or more consuming machines. If the articles are plain or filter tipped cigarettes or the like, the receptacles will normally transport such articles to one or more packing machines. If the articles are sections of filter rods, they are normally transported to one or more machines for the making of filter tipped smokers' products.

Receptacles in the form of chargers or trays for stacks of confined rod-shaped articles are often utilized for transport of plain or filter cigarettes from one or more producing machines to one or more packing machines. A packing machine for cigarettes is normally provided with a hopper or a similar container for storage of a certain number of cigarettes which are withdrawn in the form of groups or blocks (e.g., blocks of twenty cigarettes each in the customary array including two outer layers of seven cigarettes each and a median layer of six cigarettes which are staggered with respect to the cigarettes of the outer layers). Furthermore, it is customary to provide for each packing machine a reservoir which supplies cigarettes to the hopper and serves to accommodate a major or main supply of cigarettes so as to insure that the packing machine need not be arrested in response to each (even short-lasting) stoppage of the associated producing machine or machines. In many instances, the transport of cigarettes from one or more producing machines to the reservoir for a packing machine is effected by a conveyor system which circulates filled and empty receptacles. Reference may be had to German printed publication No. 1,904,495 which describes an automatic transporting system for receptacles in the form of chargers or trays. A filled tray is delivered to an evacuating station and its reciprocable bottom wall is thereupon moved to an open position. A plunger or pusher applies by gravity a requisite pressure to the top layer of cigarettes in the tray so as to expel the stack of cigarettes from the interior of the tray into an intermediate magazine. The main purpose of the plunger is to equalize the top layer of cigarettes during evacuation from the tray. The thus emptied tray is then replaced with a filled tray and the same procedure is repeated. Conveyor belts are employed to transfer cigarettes from the intermediate magazine into the reservoir for the packing machine. The transfer of fresh stacks of cigarettes from filled trays into the intermediate magazine takes place at spaced intervals so that the lowermost layer of cigarettes in a filled tray which occupies the evacuating station is often located well above the top layer of cigarettes in the intermediate magazine. Consequently, the cigarettes which are being expelled from a filled tray must cover a considerable distance by moving under the action of gravity so that at least some cigarettes are likely to change their orientation and to clog the intermediate magazine and/or the reservoir for the packing machine. Improper orientation of a single cigarette often necessitates lengthy interruptions in the operation of a packing machine with attendant losses in output and contamination of the respective reservoir and/or packing machine.

SUMMARY OF THE INVENTION

An object of the invention is to provide a novel and improved method and apparatus for manipulating rod-shaped articles, particularly rod-shaped articles which constitute or form part of smokers' products, in such a way that the articles are either prevented from changing or are highly unlikely to change their orientation during transport from filled receptacles to one or more consuming stations where the articles are subjected to further processing, such as packing, pneumatic transport or the like.

Another object of the invention is to provide a method and apparatus for the transport of cigarettes, filter stubs or analogous rod-shaped articles in such a way that the articles are manipulated gently, i.e., without excessive deformation, damage, losses of tobacco shreds and/or smudging, and that one or more consuming stations invariably receive and store a requisite minimum supply of such articles.

A further object of the invention is to provide a novel and improved method and apparatus for the transport of cigarettes or the like from successive filled receptacles of the type having pivotable, reciprocable or otherwise movable bottom walls to the hopper of a packing or analogous consuming machine.

An additional object of the invention is to provide a novel and improved control system for an apparatus which is used to remove stacks of rod-shaped articles from receptacles in the form of chargers or trays and feeds such articles to one or more packing or like machines at a rate corresponding to the rate of further processing of articles in such machine or machines.

One feature of the present invention resides in the provision of a method of feeding to a consuming station cigarettes or analogous rod-shaped articles for further processing, for example, for introducing groups of articles into envelopes which are produced in or fed to a [Packing] *packing* machine. More particularly, the invention relates to a method of feeding to a consuming station rod-shaped articles which are transported from at least one producing station (e.g., from one or more machines for the making of plain or filter cigarettes) to an evacuating station in the form of stacks of confined parallel articles. The stacks may be confined in receptacles of the type commonly known as chargers or trays and having a wall (preferably a bottom wall) which is movable between open and closed positions.

The method comprises the steps of withdrawing successive stacks from the evacuating station by moving the stacks in a substantially vertical direction (this term is intended to denote any direction which has a vertical component and to embrace a movement from a lower level to a higher level or vice versa) while maintaining the articles of the respective stacks in at least substantially unchanged positions with respect to each other whereby each of the thus withdrawn stacks forms an intermediate supply of parallel articles, transporting batches of articles from the intermediate supply in a substantially horizontal direction (this definition is intended to embrace any movement which has a horizontal component) while maintaining the articles of the respective batches in at least substantially unchanged positions with respect to each other whereby the thus transported batches form a main supply of parallel articles, and transferring articles from the main supply to the consuming station at the rate at which the articles are being processed at the consuming station. The number of articles in each batch may equal the number of articles in a stack so that the intermediate supply of articles is exhausted upon completion of each transporting step.

The method may further comprise the steps of monitoring the main supply of articles and initiating the transporting step in response to depletion of the main supply to a predetermined minimum value. The transporting step preferably comprises moving the articles of the batches sideways, and the arrangement is preferably such that the completion of each transporting step triggers a next-following withdrawing step, i.e., that a fresh stack of rod-shaped articles is removed or withdrawn from the evacuating station in response to completed transport of a batch of articles into the main supply.

The method further preferably comprises the steps of blocking the withdrawal of stacks from the evacuating station and terminating the blocking step in response to completion of a withdrawing step. If the stacks of articles are confined in aforedescribed receptacles, the blocking step may include maintaining the wall of a filled receptacle at the evacuating station in its closed position until immediately prior to start of a withdrawing step, and returning the wall of the freshly emptied receptacle to its closed position in response to completion of such withdrawing step.

The transferring step preferably comprises moving the articles from the main supply to the consuming station at a speed which is at least slightly less than the speed of articles in the course of the transporting step.

The withdrawing step preferably comprises moving successive stacks from a higher level to a lower level, and the evacuating station is preferably (but not necessarily) located at a level above the consuming station.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
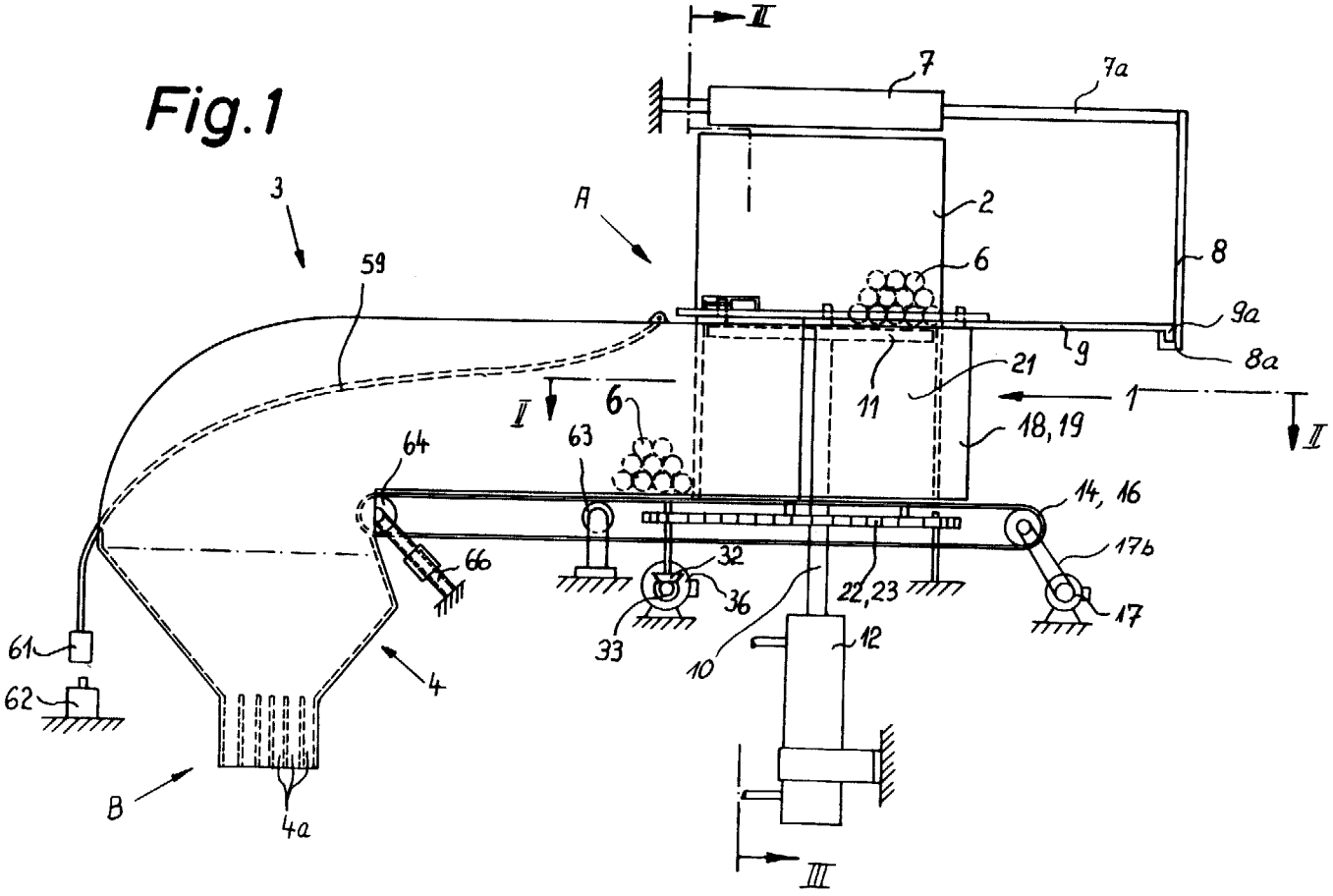
FIG. 1 is a diagrammatic side elevational view of an apparatus which embodies the invention and is used for the feeding of filter cigarettes to a packing machine.
Figure 2:
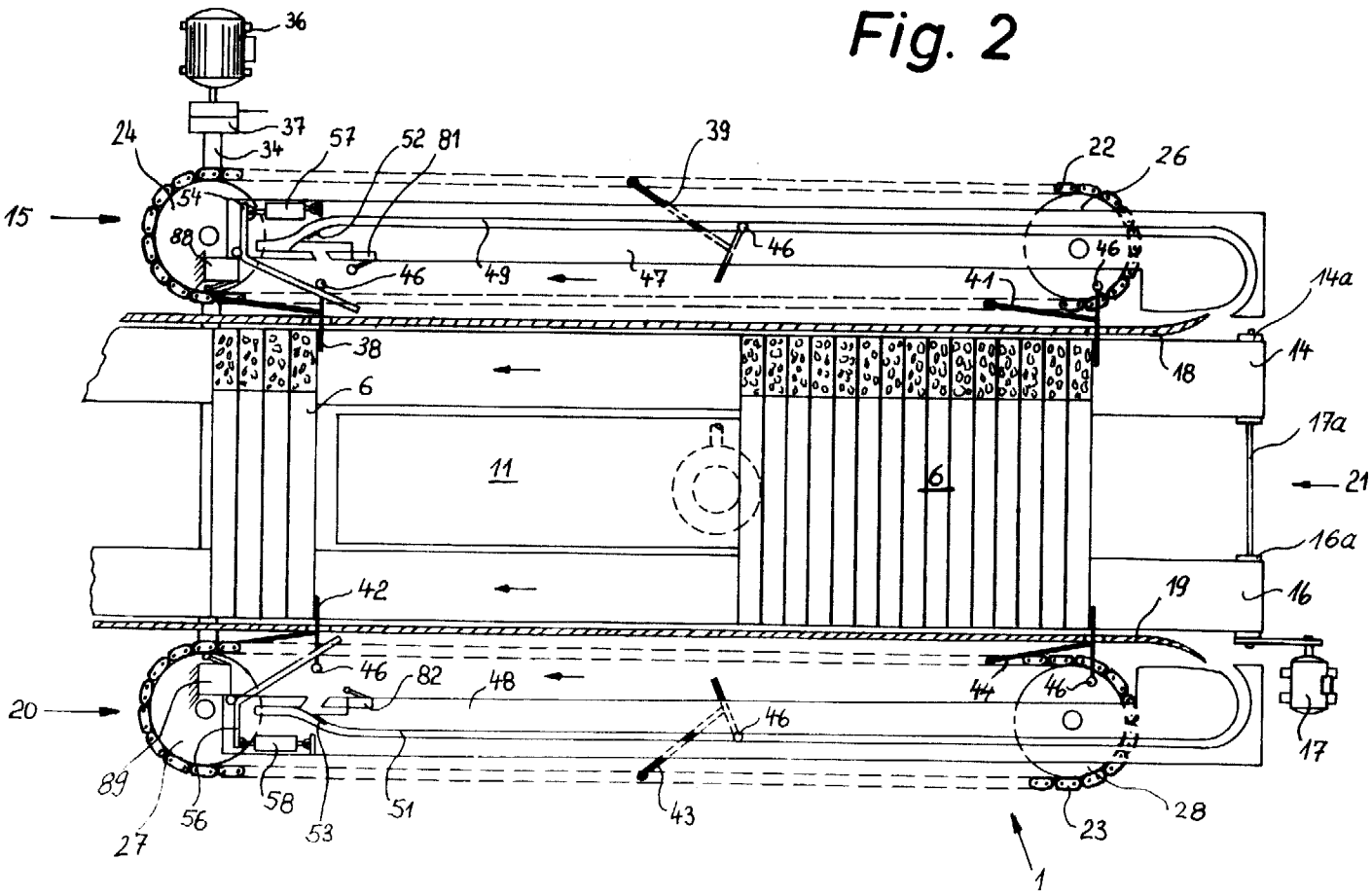
FIG. 2 is an enlarged fragmentary horizontal sectional view as seen in the direction of arrows from the line II—II of FIG. 1.
Figure 3:
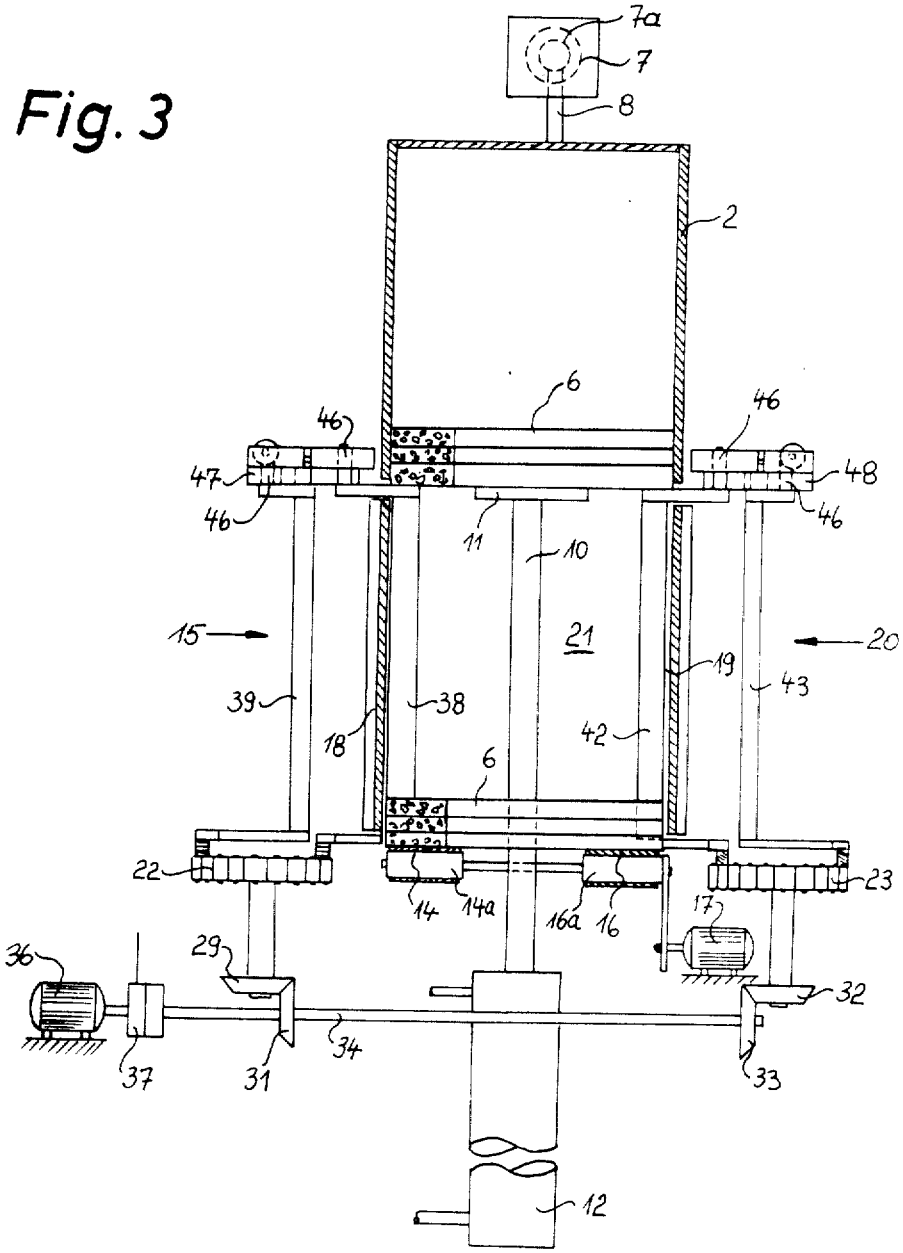
FIG. 3 is an enlarged transverse vertical sectional view substantially as seen in the direction of arrows from the line III—III of FIG. 1.

Referring first to FIGS. 1 to 3, there is shown an apparatus 1 which is used to evacuate stacks of rod-shaped articles 6 which are confined in receptacles 2 in the form of so-called chargers or trays at an evacuating station A and to feed the thus evacuated articles to the hopper 4 or analogous storing means of a consuming machine located at a consuming or processing station B, e.g., a packing machine or a machine for pneumatically transporting filter stubs or analogous rod-shaped articles to one or more machines for the making of filter cigarettes, cigars or cigarillos. The articles 6 which are stored in receptacles 2 (hereinafter called trays for short) and in the hopper 4 of the consuming machine at the station B are assumed to be filter cigarettes (see particularly FIGS. 2 and 3); however, it is evident that the apparatus 1 is equally suited for manipulation of other rod-shaped articles, such as plain cigarettes, plain or filter cigars, plain or filter cigarillos, simple filter stubs, composite filter stubs and/or others. The illustrated hopper 4 is assumed to form part of a packing machine wherein the cigarettes 6 are arrayed to form blocks or groups which are thereupon introduced into envelopes and sealed prior to introduction into cartons or the like. Each envelope may comprise one or more layers, for example, an innermost layer of tinfoil, a median layer of paper, and an outermost layer of transparent synthetic plastic material which can be provided with a customary tear strip. The lower portion of the hopper 4 is formed with several parallel vertical ducts 4a into which the cigarettes 6 descend to form vertical rows and from which a pusher or a like transfer device expels blocks or groups of, for example, twenty cigarettes each.

The apparatus 1 comprises a withdrawing or removing mechanism which serves to transfer the stack of cigarettes 6 which are confined in a filled tray 2 at the station A into an intermediate magazine 21 (hereinafter called magazine), and a transporting mechanism which serves to move batches of parallel cigarettes from the magazine 21 into a main magazine or reservoir 3 (hereinafter called reservoir) which communicates with the upper portion of the hopper 4.

The tray 2 which is shown in FIGS. 1 and 3 is one of a series of trays which are circulated along an endless path between one or more producing machines located at a producing station (such as one or more filter cigarette making machines of the type known as MAX and produced by Hauni-Werke, Körber & Co., K.G., of Hamburg-Bergedorf, Western Germany), and the evacuating station A which is located at a level above the magazine 21 and consuming station B. The conveyor system which circulates the trays 2 between the station A and the station accommodating one or more producing machines is not shown in the drawing. Reference may be had to the aforementioned German printed publication which discloses a suitable conveyor system for trays. The arrangement is preferably such that a freshly emptied tray 2 is automatically removed from the evacuating station A to be replaced with a filled tray so that a filled tray is always held in a position of readiness for transfer of its contents into the magazine 21. Each tray 2 has blocking means here shown as a slidable or otherwise movable bottom wall or gate 9 which can be moved between a closed or intercepting position in which it closes the lower end of the compartment in the respective tray and an open or extended position which is shown in FIG. 1 and in which the stack of cigarettes 6 can be evacuated by gravity from the compartment of the tray into the magazine 21. It is assumed that the tray 2 has a bottom wall 9 which is reciprocable between its open and closed positions.

The apparatus 1 further comprises a mechanism which serves to move the bottom wall 9 of a filled tray 2 at the evacuating station A first to the open position of FIG. 1 and thereupon back to the closed or blocking position. Such mechanism is illustrated in FIG. 1 and it comprises a fluid-operated motor here shown as including a pneumatically operated double-acting cylinder and piston unit having a fixedly mounted cylinder 7 which is located above the evacuating station A and whose piston rod 7a carries a downwardly extending motion transmitting arm or bar 8 having a hook-shaped lower end portion 8a which can engage and entrain a suitably configurated complementary coupling portion 9a of the bottom wall 9. When a filled tray 2 is introduced into the evacuating station A (by moving in a direction at right angles to the plane of FIG. 1), the piston rod 7a is retracted and the coupling portion 9a of the bottom wall 9 of such tray automatically engages the end portion 8a of the arm 8 when the tray 2 comes to rest. Analogously, when the contents of the tray 2 at the station A are transferred into the magazine 21 and the tray is to be removed from the station A, it again moves in a direction at right angles to the plane of FIG. 1 so that the coupling portion 9a of the bottom wall 9 (in the closed position of such bottom wall) can be automatically disengaged from the end portion 8a which remains in the corresponding position so as to automatically engage the coupling portion 9a on the closed bottom wall 9 of the next filled tray.

The withdrawing or removing mechanism for transferring the contents of a tray 2 at the evacuating station A into the magazine 21 without any appreciable changes in the relative positions of cigarettes 6 with respect to each other comprises a vertically movable support here shown as a platform 11 which is reciprocable by a second fluid-operated motor including a fixedly mounted double-acting pneumatic cylinder 12 having a piston rod 10 the upper end of which is affixed to the platform 11. The bottom wall 9 of a filled tray 2 at the evacuating station A is moved to its open position immediately after the platform 11 reaches its upper end position so that it is closely adjacent to the lowermost layer of cigarettes 6 in such tray. The platform 11 thereupon descends with the entire contents of the tray 2 and deposits the lowermost layer of cigarettes 6 onto the elongated upper stretches of two endless conveyor belts 14, 16 which are operated intermittently to thereby transport batches of cigarettes 6 sideways along a substantially horizontal path for introduction into the reservoir 3. The bottom wall 9 of a freshly emptied tray 2 at the evacuating station A is automatically returned to its closed position when the platform 11 reaches its lower end position so that the lowermost layer of cigarettes 6 which were evacuated from the tray already rests on the upper stretches of the belts 14 and 16. As shown in FIG. 2, the platform 11 is movable up and down in the space between the belts 14 and 16 and, when caused to assume its lower end position, the upper surface of the platform 11 is located at least slightly below the upper stretches of these belts.

The drive means for intermittently operating the conveyor belts 14, 16 comprises an electric motor 17 which drives a common shaft 17a for the [rest] *rear* rollers 14a, 16a of the belts through the intermediary of a belt or chain transmission 17b. Two elongated side walls 18 and 19 flank the magazine 21, the reservoir 3 and the hopper 4. These side walls hold the cigarettes 6 in the magazine 21, reservoir 3 and hopper 4 against axial or lengthwise movement to thus reduce the likelihood of jamming by preventing the cigarettes from leaving the positions in which they are parallel to each other and normal to the plane of FIG. 1.

The belts 14 and 16 constitute two conveyors of the transporting system which is utilized to move batches of cigarettes 6 from the magazine 21 into the reservoir 3. Such transporting system further comprises two lateral conveyors 15, 20 which are located at the outer sides of the walls 18, 19 and respectively comprise endless chains 22, 23 mounted for travel in a common horizontal plane (see FIG. 3). The chains 22, 23 are respectively trained around sprocket wheels 24, 26 and 27, 28. The drive means for intermittently operating the chains 22, 23 comprises an electric motor 36 which is preferably driven continuously and can rotate a shaft 34 in response to energization of an electromagnetic clutch 37. The shaft 34 drives two bevel gears 31, 33 which respectively mesh with bevel gears 29, 32. The bevel gear 29 is mounted on a vertical shaft which drives the front sprocket wheel 24 for the chain 22. The vertical shaft of the bevel gear 32 drives the front sprocket wheel 27 for the chain 23.

The chain 22 is articulately connected with three upright panels or walls 38, 39, 41 which are equidistant from each other and each of which can serve to push a batch of cigarettes 6 from the magazine 21 into the reservoir 3 or to serve as a barrier or blocking means against movement of cigarettes 6 from the magazine 21 into the reservoir 3. The chain 23 is articulately connected with three similar upright panels or walls 42, 43 and 44. In the positions of the chains 22, 23 as shown in FIG. 2, the panels 38, 42 cooperate to block the movement of cigarettes 6 from the magazine 21 into the reservoir 3, and the panels 41, 44 are located behind a stack or batch of cigarettes 6 in the magazine 21 and are ready to transfer such batch into the reservoir 3 in response to starting of the chains 22, 23, i.e., in response to energization of the clutch 37 in the power train between the motor 36 and the sprocket wheels 24, 27. The panels 39, 43 reach the positions occupied by the panels 41, 44 when the panels 41, 44 reach the positions occupied by the panels 38, 42, and the panels 38, 42 then reach the positions occupied by the panels 39, 43. It is evident that each of the chains 22, 23 can be articulately connected with only two or more than three panels. Each of the panels 38, 39, 41 and 42, 43, 44 is provided with a roller follower 46. The roller followers 46 of the panels 38, 39, 41 can be moved within or without a suitably configurated cam slot or groove 49 which is defined by a guide rail 47. A similar guide rail 48 defines a second cam slot or groove 51 for the roller followers 46 of the panels 42, 43, 44. The slots 49, 51 guide the roller followers 46 during travel of the respective panels from the front sprocket wheels 24, 27 toward the respective rear sprocket wheels 26, 28 and also toward engagement of successive panels 38, 39, 41 and 42, 43, 44 with the suitably configurated (curved) rear end portions of the side walls 18, 19 (see FIG. 2). From there on, the panels are guided by the respective side walls during travel toward the front sprocket wheels 24, 27. As shown in FIG. 3, the width of a panel can be only a small fraction of the length of a cigarette 6.

The front portions of the slots 49, 51 respectively accommodate switching devices in the form of leaf springs 52, 53 which serve to insure proper guidance of successive roller followers 46 during entry into the respective slots. As shown in FIG. 2, the switching devices 52, 53 are adjacent to the front sprocket wheels 24, 27, i.e., adjacent to the regions where the panels 38, 39, 41 and 42, 43, 44 are respectively disengaged from the side walls 18, 19 and begin to be guided by the rails 47, 48 during travel back toward the rear end portions of the respective side walls.

The means for introducing successive roller followers 46 into the front end portions of the slots 49, 51 comprises two pivotable shifting levers 54, 55 which are respectively adjacent to the front sprocket wheels 24, 27 and can be pivoted by electromagnets 57, 58. Referring to FIG. 2, it will be seen that, when the electromagnet 57 is energized so as to pivot the lever 54 in a counterclockwise direction, the longer arm of the lever 54 engages the roller follower 46 of the panel 38 and pivots this panel with reference to the chain 22 until the roller follower 46 enters the front end of the slot 49 in the guide rail 48. When the electromagnet 57 is thereupon de-energized, the lever 54 automatically reassumes the illustrated position under the action of a spring or other suitable biasing means. The mode of operation of the lever 56 for the roller followers 46 of the panels 42, 43, 44 is analogous. The electromagnets 57, 58 are shown as being mounted on the guide rails 47, 48.

The reservoir 3 contains a flexible monitoring device or detector 59 which rests on the uppermost layer of cigarettes 6 and reduces the likelihood of undesirable changes in orientation of cigarettes in the reservoir. Furthermore, the detector 59 serves as a level indicator in that it carries a mass or weight 61 which can trip a detector in the form of a limit switch 62 when the supply of cigarettes 6 in the reservoir 3 is reduced to a predetermined minimum value which warrants the admission of a fresh batch of cigarettes from the magazine 21.

FIG. 1 shows that the upper stretches of the belts 14, 16 travel above a roll 63 which is parallel with the cigarettes 6 and is located substantially at the boundary between the magazine 21 and reservoir 3. The front roll 64 for the belts 14, 16 can be moved by a suitably inclined feed screw 66 or an analogous adjusting device to thereby flex the front portions of the upper stretches of belts 14, 16 (in the reservoir 3) relative to the rear portions (in the magazine 21). This renders it possible to combine the apparatus 1 with existing consuming machines by insuring an optimum transport of cigarettes or analogous rod-shaped articles from the magazine into the reservoir and hopper or hoppers. By inclining the front portions of the upper stretches of the belts 14, 16, the operator can also promote the sidewise movement of cigarettes 6 toward the hopper 4 of the consuming machine. However, an equally important feature of such adjustability of the belts 14, 16 is that the outlet of the apparatus 1 can be adjusted to insure satisfactory alignment with the hopper of and a reservoir for an existing consuming machine.

Figure 4:
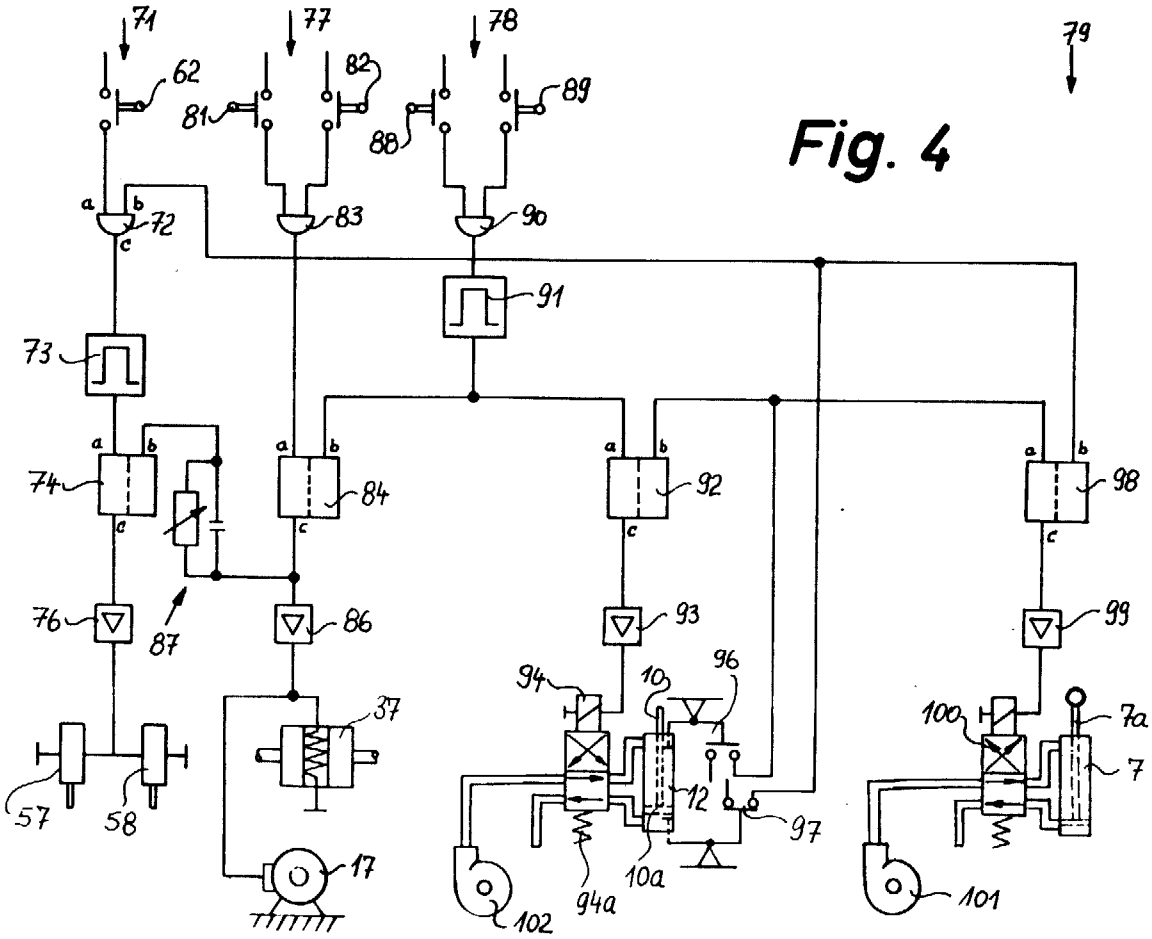
FIG. 4 is a circuit diagram of the control system for the apparatus or FIGS. 1 to 3.

FIG. 4 illustrates the control system of the apparatus. This control system comprises four control units 71, 77, 78 and 79. The control unit 71 includes the aforementioned limit switch 62 which can be actuated by the weight 61 of the monitoring means 59 in the reservoir 3. The purpose of this control unit is to effect an energization of the electromagnets 57, 58 for the shifting levers 54, 55. The control unit 77 serves to energize the electromagnetic clutch 37 in the power train between the motor 36 and the front sprocket wheels 24, 27 for the chains 22, 23 and to start the motor 17 which drives the belts 14 and 16. The control unit 78 serves to deenergize the clutch 37 and to arrest the motor 17 as well as to control the operation of the double-acting cylinder 12 which moves the platform 11 toward and away from the evacuating station A. The purpose of the control unit 79 is to control the operation of the double-acting cylinder 7 which moves the bottom walls 9 of trays 2 at the station A.

The control unit 71 further comprises a logic circuit 72 of the type known as AND-gate. The input a of the AND-gate 72 receives a signal in response to actuation of the limit switch 62. The output c of the AND-gate 72 is connected with the input a of a flip-flop circuit 74 by way of a pulse shaper 73. The output c of the flip-flop 74 is connected with the windings of the electromagnets 57, 58 by way of an amplifier 76. The output c of the AND-gate transmits a signal for energization of electromagnets 57, 58 when the input a receives a signal simultaneously with the input b.

The control circuit 77 comprises two detectors in the form of normally open limit switches 81, 82 which are connected with the two inputs of an AND-gate 83. The output of the AND-gate 83 is connected with the input a of a flip-flop 84 whose output c is connected with the motor 17 and electromagnetic clutch 37 by way of an amplifier 86. The motor 17 is started and the clutch 37 is energized in response to simultaneous closing of the limit switches 81, 82. As shown in FIG. 2, the limit switches 81, 82 are respectively actuatable by the levers 54, 55, i.e., in response to energization of the electromagnets 57, 58. The output c of the flip-flop 84 in the control circuit 77 is further connected with the signal erasing input b of the flip-flop 74 in the control unit 71 by way of an adjustable R-C link 87 which constitutes a time delay device. When the input b of the flip-flop 74 receives a signal from the time delay device 87, the signal at the output c is erased and the electromagnets 57, 58 are de-energized.

The control unit 78 comprises two detectors in the form of normally open limit switches 88, 89 which, as shown in FIG. 2, are mounted adjacent to the front sprocket wheels 24, 27 for the chains 22, 23 and are respectively actuatable by successive panels 38, 39, 41 and 42, 43, 44. The limit switches 88, 89 are connected to the two inputs of an AND-gate 90 whose output is connected with a pulse shaper 91. The output of the pulse shaper 91 is connected with a signal erasing input b of the flip-flop 84 in the control unit 77 and with the input a of a flip-flop 92. The output c of the flip-flop 92 is connected with the solenoid of an electropneumatic valve 94 by way of an amplifier 93. The valve 94 controls the flow of pressurized fluid (preferably air) from a fluid source 102 to the chambers of the double-acting cylinder 12. When the platform 11 is moved to its upper end position, the piston 10a in the cylinder 12 closes a resetting switch 96 which is connected with the signal erasing input b of the flip-flop 92. When the platform 11 reaches its lower end position, the piston 10a actuates a further resetting switch 97 which is connected with the input b of the AND-gate 72 in the control unit 71.

The control unit 79 comprises a flip-flop 98 whose first input a is connected with the resetting switch 96 for the flip-flop 92 and whose second (signal erasing) input b is connected with the resetting switch 97. The output c of the flip-flop 98 is connected with the solenoid of an electropneumatic valve 100 by way of an amplifier 99. The valve 100 controls the flow of a pressurized fluid (preferably air) from a fluid source 101 to the chambers of the double-acting cylinder 7. The cylinder 7 is caused to move the bottom wall 9 of a filled tray 2 at the evacuating station A to open position in response to closing of the switch 96, and the bottom wall 9 is thereupon returned to its closed position in response to closing of the switch 97.

The operation:

It is assumed that a filled tray 2, with its bottom wall 9 in closed position, is located at the evacuating station A and that the reservoir 3 contains a relatively small main supply of cigarettes 6. This means that the hopper 4 is still filled with cigarettes. When the supply of cigarettes in the reservoir 3 is depleted to a predetermined minimum value, the weight 61 of the monitoring means 59 actuates the switch 62 while the platform 11 dwells in its lower end position so that the switch 97 of the control unit 78 is closed. Thus, the input b of the AND-gate 72 in the control unit 71 receives a signal. When the input a of this AND-gate receives a signal in response to the closing of the switch 62, the output c transmits a signal which energizes the electromagnets 57, 58 by way of the flip-flop 74 and amplifier 76. The energized electromagnets 57, 58 respectively pivot the levers 54, 55 which retract the blocking panels 38, 42 and move the followers 46 of these panels into the respective slots 49, 51. The panels 38, 42 are retracted through suitable openings in the side walls 18, 19.

The levers 54, 56 respectively close the switches 81, 82 of the control unit 77 whereby the AND-gate 83 transmits a signal which starts the motor 17 and energizes the electromagnetic clutch 37 by way of the flip-flop 84 and amplifier 86. The clutch 37 connects the motor 36 with the shaft 34 so that the chains 22, 23 of the lateral conveyors 15, 20 are set in motion. The motor 17 drives the belts 14, 16 so that the upper stretches of these belts transport the batch or stack of cigarettes 6 which was temporarily stored in the magazine 21 toward the reservoir 3. The stack or batch remains at least substantially intact (i.e., the relative positions of cigarettes 6 which form such batch or stack remain substantially unchanged) because the chains 22, 23 respectively drive the panels 41, 44 which push the stack toward the reservoir 3 while the stack rests on the upper stretches of the moving belts 14 and 16. The panels 38, 42 are retracted so that they cannot block the entry of cigarettes 6 into the reservoir 3.

The output signal from the flip-flop 84 of the control unit 77 is further transmitted to the time delay device 87 which produces a signal with a certain delay so that the signal at the output c of the flip-flop 74 disappears and the electromagnets 57, 58 are de-energized to effect a return movement of the levers 54, 56 to the positions shown in FIG. 2. The chains 22, 23 continue to transport the respective panels 38, 39, 41 and 42, 43, 44 whereby the roller followers 46 of the panels 38, 39 and 43, 43 respectively travel in the slots 49, 51 of the guide rails 47, 48. The panels 41, 44 are guided by the side walls 18, 19 and effect a complete evacuation of cigarettes from the magazine 21 prior to actuating the switches 88, 89 of the control unit 78. The leaf springs 52, 53 insure that the roller followers 46 of the panels 38, 42 remain in the respective slots 49, 51 after the levers 54, 56 return to their starting positions. The belts 14, 16 transport the cigarettes from the outlet of the reservoir 3 toward and cause such cigarettes to enter the hopper 4 of the consuming machine. The evacuation of cigarettes from the magazine 21 is carried out mainly by the panels 41 and 44 but the belts 14, 16 assist these panels by moving the lower layer of the stack of cigarettes toward and into the reservoir 3. Since the belts 14, 16 move cigarettes from the reservoir 3 toward and into the hopper 4 only when the chains 22 and 23 are in motion, a wall of cigarettes is always present in front of the panels 38, 42 or FIG. 2 (or in front of the panels 41, 44 or 39, 43 when these panels occupy the positions shown in FIG. 2 as being occupied by the panels 38 and 42). This reduces the likelihood of a collapse of the stacks of cigarettes in front of and behind the panels 38, 42 (as viewed in FIG. 2) and hence the likelihood of improper orientation of cigarettes such as could cause jamming in the magazine 21, reservoir 3 and/or hopper 4.

The chains 22 and 23 are arrested when the panels 41, 44 reach and actuate the switches 88, 89 of the control unit 78. The AND-gate 90 then produces a signal which is transmitted to the erasing input b of the flip-flop 84 by way of the pulse shaper 91. Such signal erases the signal at the output c of the flip-flop 84 so that the motor 17 is arrested and the clutch 37 is de-energized. Thus, the chains 22, 23 are arrested simultaneously with the belts 14 and 16.

The pulse shaper 91 further transmits a signal to the input a of the flip-flop 92 which energizes the solenoid of the valve 94 by way of the amplifier 93. The valve 94 connects the source 102 of pressurized fluid with the lower chamber of the double-acting cylinder 12 so that the piston rod 10 slowly lifts the platform 11 and the piston 10a allows or causes the switch 97 to open. The switch 96 is closed when the platform 11 reaches its upper end position whereby the input b of the flip-flop 92 receives a signal which erases the signal at the output c so that the solenoid of the valve 94 is de-energized and the spring 94a of this valve causes the valve member to assume a position in which the source 102 is connected with the upper chamber of the cylinder 12 so that the platform 11 descends and lowers a fresh stack of cigarettes 6 into the magazine 21.

As mentioned above, the closing of the switch 96 by the piston 10a results in transmission of a signal to the input a of the flip-flop 98 in the control unit 79. The flip-flop 98 energizes the solenoid of the valve 100 by way of the amplifier 99 whereby the valve 100 connects the source 101 of the pressurized fluid with the double-acting cylinder 7 in such a way that the arm 8 of the piston rod 7a moves the bottom wall 9 of the tray 2 at the evacuating station A to its open position. This takes place while the platform 11 dwells in its upper end position. The cylinder 12 thereupon moves the platform 11 downwardly (because the switch 96 was closed by the piston 10a). When the platform 11 reaches its lower end position in which the stack of cigarettes 6 which were evacuated from the tray 2 at the station A rests on the upper stretches of the belts 14, 16, the piston 10a actuates the switch 97 which transmits a signal to the erasing input b of the flip-flop 98 so that the valve 100 causes the cylinder 7 to retract its piston rod 7a whereby the arm 8 returns the bottom wall 9 of the freshly emptied tray 2 to its closed position. At the same time, the closed switch 97 transmits a signal to the input b of the AND-gate 72 in the control unit 71 so that the electromagnets 57, 58 can be energized again in the aforedescribed manner as soon as the weight 61 of the monitoring means 59 closes the limit switch 62. The entire cycle is then repeated in the aforedescribed manner. It is assumed that the freshly emptied tray 2 is replaced with a filled tray before the supply of cigarettes 6 in the reservoir 3 is depleted to such an extent that the weight 61 can reach and actuate the limit switch 62.

The monitoring means 59 in the reservoir 3 prevents overfilling of the reservoir during temporary or longer-lasting stoppage of the consuming machine. Thus, the monitoring means 59 insures that the floating main supply of cigarettes 6 always fluctuates between predetermined uppermost and lowermost levels. When the number of cigarettes 6 in the reservoir 3 is reduced to the lowermost permissible value or level, the switch 62 produces a signal which results in energization of electromagnets 57, 58 and withdrawal of blocking panels (38, 42 in FIG. 2) from their blocking positions. The levers 54, 56 then actuate the switches or detector means 81, 82 which start the motor 17 and energize the clutch 37. When the transport of a batch or stack of cigarettes 6 from the magazine 21 into the reservoir 3 is completed (i.e., when the supply of cigarettes in the reservoir 3 increases to the maximum permissible level), the movable panels 41, 44 of FIG. 2 actuate the detector switches 88, 89 which cause the platform 11 to rise and to initiate the movement of the bottom wall 9 of a filled tray 2 at the evacuating station A to its open position. The bottom wall 9 returns to its closed position when the platform 11 returns to its lower end position. In this way, the reservoir 3 receives a fresh batch or stack of cigarettes only at the rate at which the cigarettes are being further processed in the consuming machine including the hopper 4. A stack of cigarettes 6 which can fill a tray 2 can constitute only a small portion of the main supply of cigarettes in the reservoir 3 so that the level of cigarettes in this reservoir changes only little during an interval beginning with introduction of a fresh batch and ending with actuation of the switch 62.

The feature that the cigarettes 6 are transported sideways during withdrawal from filled trays 2 as well as during transport from the magazine 21 into the reservoir 3 reduces the likelihood that the cigarettes would lose tobacco particles at the free ends of their wrapped tobacco filler rod sections.

In the illustrated apparatus, the intermediate supply of cigarettes 6 in the magazine 21 is exhausted whenever the transporting means including the belts 14, 16 and chains 22, 23 is set in motion, i.e., the number of cigarettes in each batch which is being transported into the reservoir 3 equals the number of cigarettes in the stack which was transferred into the magazine during the preceding downward movement of the platform 11. Such mode of operation is preferred at this time even though it is within the purview of the invention to transport into the reservoir 3 batches each of which contains a predetermined number of cigarettes whereby such number may be less than or exceeds the number of cigarettes in a filled tray.

The detector switches 88, 89 insure that the magazine 21 receives a fresh stack of cigarettes 6 in response to completed transport of a batch of cigarettes from the magazine into the reservoir 3. The switch 96 insures that the bottom wall 9 of a filled tray 2 at the evacuating station A cannot be moved to its open position before the platform 11 reaches its upper end position so that the stack of cigarettes which are freed for evacuation from the tray immediately reaches the upper surface of the platform 11, without allowing the cigarettes to change their mutual positions during movement toward the platform as well as during movement with the platform onto the upper stretches of the belts 14 and 16. As explained above, the belts 14, 16 thereupon cooperate with the side walls 18, 19 and with the rearmost and foremost pairs of panels on the chains 22, 23 to insure that the mutual positions of cigarettes 6 do not change or change negligibly during storage in the magazine 21 as well as during transport into the reservoir 3.

A fresh filled tray 2 is moved to the evacuating station A as soon as the evacuation of the contents of the preceding filled tray is completed. It is therefore important to close the bottom wall 9 of a freshly emptied tray as soon as possible, i.e., as soon as the uppermost layer of the stack on the descending platform 11 has been moved below the plane of the bottom wall 9. This is achieved by the provision of the switch 97 which causes the control unit 79 to actuate the cylinder 7 so that the latter returns the bottom wall 9 of the freshly emptied tray 2 to it closed position as soon as the platform 11 reaches its lower end position. The tray 2 is then free to leave the station A to be immediately replaced with a filled tray.

In accordance with a further feature of the invention, the transport of cigarettes 6 from the reservoir 3 into the hopper 4 of the packing machine at the consuming station B is carried out at a speed which is less than the speed of evacuation of cigarettes from the magazine 21. This insures that the cigarettes in the reservoir 3 form a wall or barrier which prevents excessive movements of freshly admitted cigarettes relative to each other and thus reduces the likelihood of improper orientation of one or more cigarettes in the main supply which is stored in the reservoir 3. In other words, it is advisable to transport the cigarettes from the magazine 21 in such a way that the cigarettes cannot drop into the reservoir 3 because such mode of manipulating could lead to jamming in the reservoir and/or hopper 4.

An important advantage of the improved apparatus is that it automatically replenishes the supply of cigarettes in the hopper 4 and also that the orientation of cigarettes is not only highly unlikely to but normally cannot change so that the possibility of jamming in the magazine 21, reservoir 3 and/or hopper 4 is very remote. This is attributed to the fact that the cigarettes are always confined during movement from a filed tray 2 at the evacuating station A and all the way into the reservoir 3 and hopper 4 at the consuming station B. Thus, the platform 11 is sufficiently close to the station A when the bottom wall 9 of a filled tray 2 at this station is moved to the open position to insure that the gravitational descent of cigarettes onto the upper surface of the platform is negligible. From there on, the cigarettes are confined between the side walls 18, 19, upper stretches of the belts 14, 16 and two or four of the panels 38, 39, 41 and 42, 43, 44.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A method of feeding to a consuming station cigarettes or analogous rod-shaped articles which are transported on holders from at least one producing station to an evacuating station in the form of stacks of confined parallel articles and are further processed at the consuming station, each stack being made up only of the entire contents of one said holder, comprising the steps of withdrawing each successive stack from each successive holder at said evacuating station by moving the stack in a substantially vertical direction only—while maintaining the articles of the respective stack in at least substantially unchanged position with respect to each other—to an intermediate supply station where each of the thus withdrawn stacks forms an intermediate supply of articles; transporting each of said stacks of articles from said intermediate supply station in a substantially horizontal direction by moving the articles of said stack sideways and while maintaining the articles of the respective stacks in at least substantially unchanged position in which they have been during vertical movement from said evacuating station to said intermediate supply station whereby the thus successively transported stacks form a main supply of articles; and transferring articles from said main supply to the consuming station in at least substantially parallel position with respect to each other and at the rate at which the articles are being processed at said consuming station.

2. A method as defined in claim 1, further comprising the steps of monitoring said main supply of articles and initiating said transporting step in response to depletion of said main supply to a predetermined value.

3. A method as defined in claim 1, further comprising the step of starting a fresh withdrawing step in response to completion of each transporting step.

4. A method as defined in claim 3, further comprising the steps of blocking the withdrawal of stacks of articles from said evacuating station and terminating said blocking step immediately prior to start of said withdrawing step.

5. A method as defined in claim 1, wherein said transferring step comprises moving the articles from said main supply at a speed which is less than the speed of articles in the course of said transporting step.

6. A method as defined in claim 1, wherein said withdrawing step comprises moving successive stacks from a higher level to a lower level.

7. A method as defined in claim 1, wherein said evacuating station is located at a level above said consuming station.

8. Apparatus for feeding to a consuming station cigarettes or analogous rod-shaped articles which are transported in receptacles from at least one producing station to an evacuating station and wherein each filled receptacle contains a stack of parallel articles, comprising a reservoir arranged to store a floating supply of articles for delivery to said consuming station at the rate at which the articles are being processed at the consuming station; a magazine disposed between said evacuating station and said reservoir; withdrawing means operative to move stacks of articles in a substantially vertical direction from successive filled receptacles at said evacuating station into said magazine, said withdrawing means and said magazine comprising cooperating elements arranged to maintain the articles of said stacks in at least substantially unchanged positions with respect to each other; transporting means operative to move batches of articles from said magazine into said reservoir in a substantially horizontal direction, including means for maintaining the articles of such batches in at least substantially unchanged positions with respect to each other, said transporting means comprising at least one conveyor which includes a first portion arranged to withdraw articles from said magazine and a second portion arranged to move the thus withdrawn articles in said reservoir; and adjusting means for changing the position of one said conveyor portions with respect to the other conveyor portion.

9. Apparatus as defined in claim 8, wherein said means for maintaining the articles of said batches, in at least substantially unchanged positions with respect to each other comprises at least one pair of mobile panels arranged to push the articles of said batches during transport into said reservoir.

10. Apparatus as defined in claim 8, wherein said conveyor comprises at least one endless belt having an article-supporting upper stretch.

11. Apparatus for feeding to a consuming station cigarettes or analogous rod-shaped articles which are transported in receptacles from at least one producing station to an evacuating station, wherein each filled receptacle contains a stack of parallel articles, and wherein each receptacle comprises a wall which is movable between an open position in which it affords access to the stack of articles in such receptacle and a closed position, comprising a reservoir arranged to store a floating supply of articles for delivery to said consuming station at the rate at which the articles are being processed at the consuming station; a magazine disposed between said evacuating station and said reservoir; withdrawing means operative to move stacks of articles in a substantially vertical direction from successive filled receptacles at said evacuating station into said magazine, said withdrawing means and said magazine comprising cooperating elements arranged to maintain the articles of said stacks in at least substantially unchanged positions with respect to each other and said withdrawing means further comprising a support for stacks which is movable between a first end position adjacent to a filled receptacle at said evacuating station and a second end position which said support assumes upon completed transport of a stack of articles into said magazine; control means including means for moving the wall of a filled receptacle at said evacuating station to said open position in response to movement of said support to said first end position and for moving the wall of such receptacle back to said closed position in response to movement of said support to said second end position; and transporting means operative to to move batches of articles from said magazine into said reservoir in a substantially horizontal direction, including means of maintaining the articles of such batches in at least substantially unchanged positions with respect to each other.

12. Apparatus as defined in claim 11, wherein said transporting means comprises two endless conveyors and said means for maintaining the articles of said batches in at least substantially unchanged positions with respect to each other comprises confining panels mounted on said endless conveyors.

13. Apparatus as defined in claim 11, wherein said withdrawing means comprises a vertically movable support and said magazine is disposed at a level below said evacuating station so that the stacks of articles on said support are moved downwardly during transport from said evacuating station.

14. Apparatus as defined in claim 11, wherein the number of articles in each of said batches equals the number of articles in said stacks so that the supply of articles in said magazine is exhausted in response to each operation of said transporting means.

15. Apparatus as defined in claim 11, wherein said walls are the bottom walls of receptacles at said evacuating station.

16. Apparatus as defined in claim 11, wherein the receptacles are polygonal trays.

17. Apparatus as defined in claim 11, further comprising means for monitoring the supply of articles in said reservoir and for producing signals in response to depletion of such supply to a predetermined minimum value, and further comprising blocking means movable to and from a blocking position in which said blocking means prevents the transport of articles from said magazine into said reservoir, and control means for moving said blocking means from said blocking position in response to said signals.

18. Apparatus as defined in claim 17, wherein said control means includes electromagnet means which is energizable in response to said signals to thereby move said blocking means from said blocking position.

19. Apparatus as defined in claim 11, further comprising blocking means movable to and from a blocking position in which said blocking means prevents the transport of articles from said magazine into said reservoir, and control means for operating said transporting means in response to movement of said blocking means from said blocking position.

20. Apparatus as defined in claim 19, wherein said control means comprises detector means which is arranged to produce signals in response to movement of said blocking means from said blocking position and said transporting means comprises motor means which is started in response to said signals.

21. Apparatus as defined in claim 20, wherein said transporting means comprises a plurality of endless conveyors and said blocking means comprises panels articulately connected with said conveyors.

22. A method of feeding to a consuming station cigarettes or analogous rod-shaped articles which are transported from at least one producing station to an evacuating station in the form of stacks of parallel articles confined in receptacles of the type having a wall movable between open and closed positions to allow for withdrawal of a stack from such receptacle in the open position of said wall and which articles are further processed at the consuming station, comprising the steps of moving the walls of successive filled receptacles at said evacuating station to open positions; withdrawing the stacks from the receptacles at said evacuating station immediately after movement of the respective walls to open positions by moving the respective stacks in a substantially vertical direction while maintaining the articles of the respective stacks in at least substantially unchanged positions with respect to each other whereby each of the thus withdrawn stacks forms an intermediate supply of articles; returning the walls of receptacles to closed positions in response to completion of the respective withdrawing steps; transporting batches of articles from said intermediate supply in a substantially horizontal direction while maintaining the articles of the respective batches in at least substantially unchanged positions with respect to each other whereby the thus transported batches form a main supply of articles; and transferring articles from said main supply to the consuming station at the rate at which the articles are being processed at said consuming station.

23. Apparatus for feeding to a consuming station cigarettes or analogous rod-shaped articles which are transported in receptacles from at least one producing station to an evacuating station and wherein each filled receptacle contains a stack of parallel articles, comprising a reservoir arranged to store a floating main supply of articles for delivery to said consuming station at the rate at which the articles are being processed at the consuming station; a magazine disposed between said evacuating station and said reservoir; withdrawing means operative to move stacks of articles in a substantially vertical direction from successive filled receptacles at said evacuating station into said magazine, said withdrawing means and said magazine comprising cooperating elements arranged to maintain the articles of said stacks in at least substantially unchanged positions with respect to each other; and transporting means operative to move batches of articles from said magazine into said reservoir in a substantially horizontal direction, including means for maintaining the articles of such batches in at least substantially unchanged positions with respect to each other, said last mentioned means comprising at least one pair of mobile panels which are disposed between said reservoir and said magazine during introduction of a stack of articles into said magazine to thus temporarily prevent the movement of articles from said magazine into said reservoir.

*24. In a system for conveying cigarettes or other rod-like articles in containers, said system including an article delivery device and an article receiving device, means for inserting articles into containers, and means for conveying containers, apparatus for forming a stream of articles, comprising an unloading station; means for conveying through said unloading station a succession of containers containing batches of the articles; means for successively removing batches of articles from said containers; retaining means for receiving and confining batches of articles from said containers, said retaining means including spaced members arranged to confine each end of a batch; means for removing said spaced members from around said batch; and means for conveying away from said unloading station, as a continuous stream after said spaced members have been removed, batches of articles received by said retaining means.*

*25. Apparatus as claimed in claim 24 including means for intermittently driving said article conveying means and means for intermittently moving a container through said unloading station in synchronism with said conveying*

*means, said batch removing means being arranged to remove articles from said containers when said conveying means and said container moving means are stationary.*

*26. Apparatus as claimed in claim 25 wherein the article conveying means comprises an endless conveyor.*

*27. Apparatus as claimed in claim 26 wherein the spaced members include upstanding end plates associated with said conveyor, the spacing between adjacent end plates matching one dimension of a container.*

* * * * *